United States Patent [19]

Etheridge et al.

[11] 4,364,517

[45] Dec. 21, 1982

[54] HOPPER CLEANER ATTACHMENT

[76] Inventors: Robert E. Etheridge, P.O. Box 5421, Greenville, Miss. 38701; Philip L. Lewis, Rte. 1, Box 71-A, Glen Allan, Miss. 38744

[21] Appl. No.: 167,525

[22] Filed: Jul. 11, 1980

[51] Int. Cl.³ .............................................. B64D 1/18
[52] U.S. Cl. .................................. 239/171; 239/650; 244/136
[58] Field of Search ......................... 239/650, 171, 1; 244/136 R, 136.5; 222/189, 178, 413, 485

[56] References Cited

U.S. PATENT DOCUMENTS 3,220,674 11/1965 Ordemann et al. ................. 244/136
3,463,424 8/1969 Pickell ................................ 244/136
3,499,606 3/1970 Smith .................................. 239/171
3,860,202 1/1975 Johnson .............................. 244/136

Primary Examiner—James B. Marbert
Attorney, Agent, or Firm—Harvey B. Jacobson

[57] ABSTRACT

The main storage hopper of an aerial crop dusting apparatus incorporated in aircraft is equipped with a suction pipe which extends from the outlet to the lowest depths of the hopper to insure that all the insecticide stored therein is dispensed. The suction pipe has a constant cross-sectional area throughout its length to insure constant fluid flow. The pipe attaches to the outlet by a connector which has a free bevelled edge to contact a bevelled edge of the pipe. A nut is positioned over a flange on the pipe and has threads which connect with cooperating threads on the connector to force the bevelled edges into tight communication.

9 Claims, 4 Drawing Figures

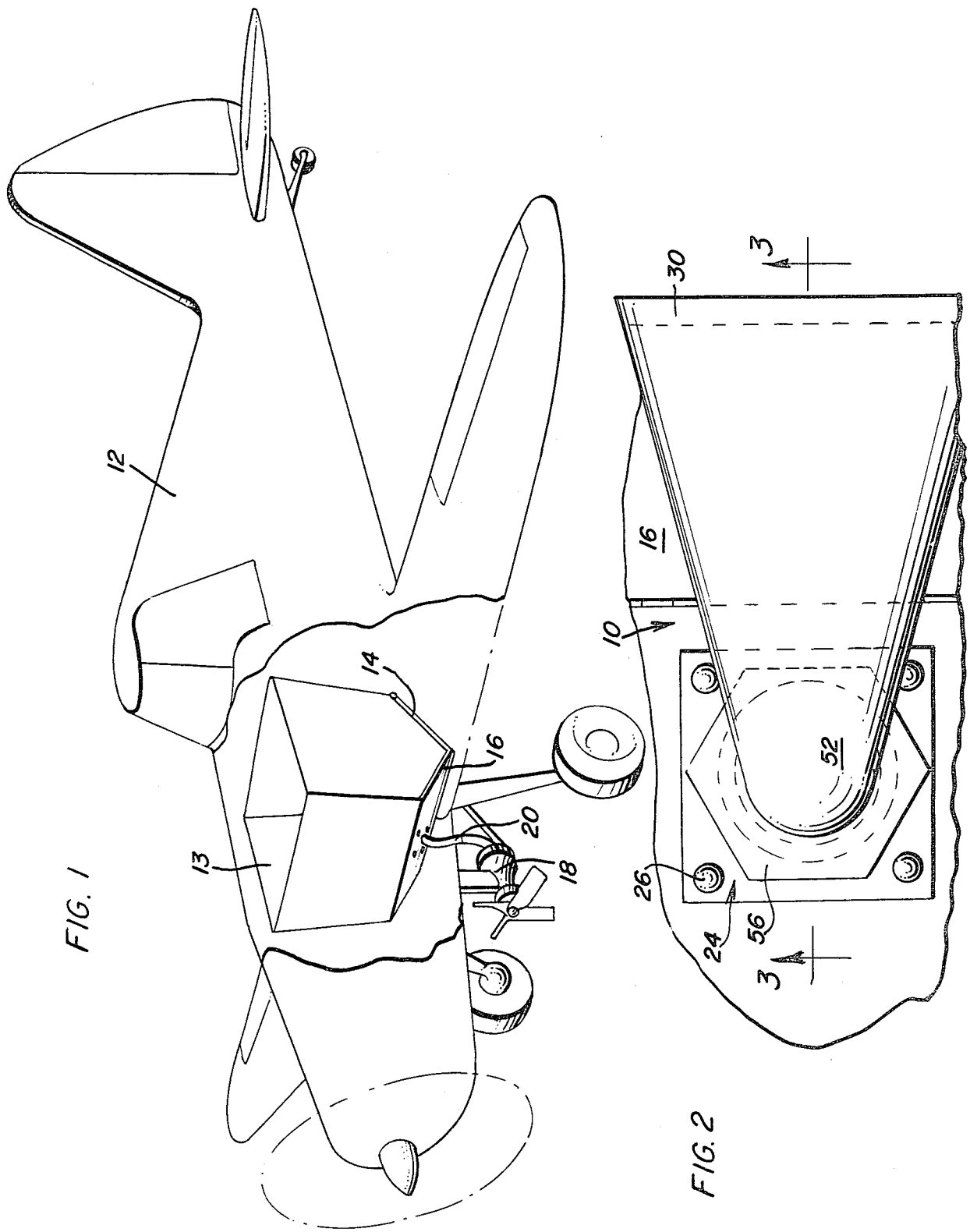

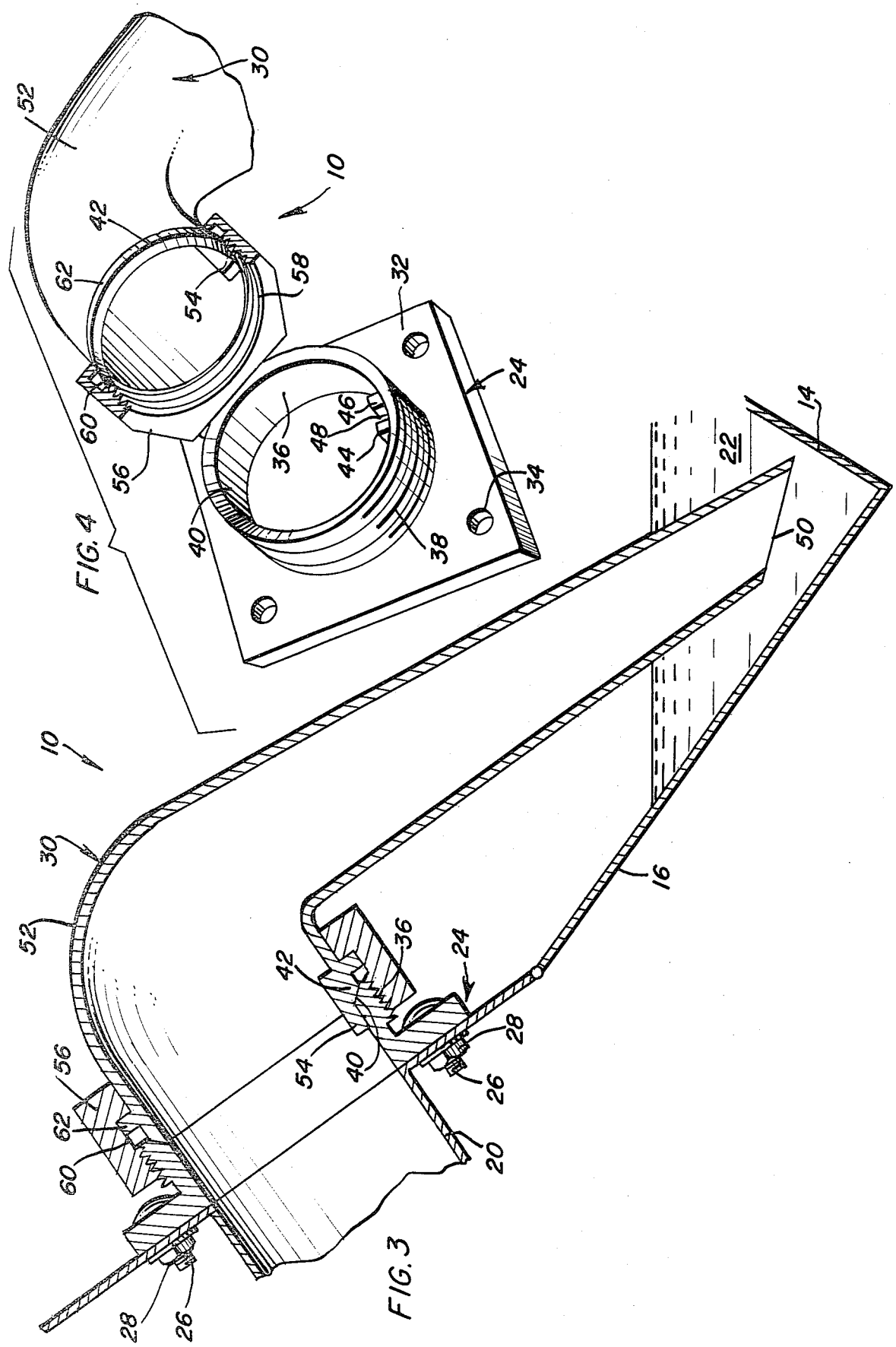

HOPPER CLEANER ATTACHMENT

BACKGROUND OF THE INVENTION

1. Field of the Invention

This invention relates to dispensing apparatus for dispensing insecticide material from a crop dusting aircraft.

2. Discussion of Related Art

A crop spraying or crop dusting aircraft carries a storage bin known as the "hopper" which is filled with the chemical to be sprayed by the aircraft. The hopper is generally a metal box which decreases in cross-sectional area from the top toward the bottom. The bottom of the hopper consists primarily of two doors which can be opened in an emergency to quickly dump the chemical in order to lighten the weight of the aircraft. The hopper doors can also be used in dispersing a payload such as dry fertilizer. Ordinarily, when the hopper is filled with a liquid, the liquid is pumped from the hopper through a small hole located about six inches above the bottom. When the level of the liquid reaches the level of the hole, no more chemical can be pumped from the hopper and the airplane returns to the landing field with approximately six inches of chemical left in the hopper. As long as the aerial applicator is using the same chemical, there is no harm or inconvenience associated with the inability to dispense the entire payload. However, in actual practice, a person in the crop spraying business may be spraying a rice crop with one chemical one day and a soybean or cotton crop with an entirely different chemical that is totally incompatible with the chemical used the previous day. It is not unusual to have the same aircraft used in spraying a variety of chemicals even in one day. Accordingly, it is necessary to remove the six inches of liquid chemical from the hopper each time the type of chemical is changed. One method of removing this remaining chemical fertilizer is by opening the doors in the bottom of the hopper and dumping the unused chemical. This dumping is not only wasteful of the chemical but is generally regarded as an unsafe operation since it deposits a large quantity of chemical on the ground in one place.

U.S. Pat. No. 2,404,812, issued July 30, 1946 to Rankin, shows a device for atomizing certain chemical and oils for the production of dry oil steam for signalling. The Rankin device includes a tank disposed in an aircraft. An outlet line is attached to the tank and terminates in a flexible end within the tank carrying a weight at its end portion to enable the open receiving mouth of the flexible pipe end to always seek by gravity the lowest point in the tank.

U.S. Pat. No. 3,860,202, issued Jan. 14, 1975, to Johnson, shows an apparatus for dispensing powdered granular insecticide material. The Johnson apparatus includes a storage hopper having downwardly converging walls terminating in a relatively small removal zone. An elevator conveyor taking the form of an auger has its lower end disposed within the removal zone of the storage hopper and inclines upwardly to an upper discharge location within the hopper where insecticide material positively removed from the removal zone of the storage hopper is deposited onto a filter screen across the top of a feed hopper.

SUMMARY OF THE INVENTION

One object of the present invention is to provide a suction pipe for a crop spraying apparatus which pipe allows all liquid chemical disposed in the hopper to be utilized, thus improving the efficiency of the aerial spraying operation.

A further object of the present invention is to provide a suction pipe for a crop spraying hopper which can be easily removed in the event that dry chemical fertilizer is placed in the hopper for distribution thus insuring that the suction pipe will not interfere with free flow of the dry fertilizer.

An even still further object of the present invention is to provide a suction pipe for the hopper of a crop spraying apparatus which pipe is made from chemical resistant materials in order that the pipe will be durable and effective in use.

In accordance with the above objects, the hopper cleaner attachment of the present invention includes an adaptor which fits into the hole in the hopper tank through which liquid is generally pumped. The adaptor is threaded and furnished with an internal keyway at the adaptor bottom. The connection from the pump fits into the outside of the adaptor. A tube approximately 2 inches in diameter with a 90° elbow at one end attaches to the adaptor and has a key attached to fit into the adaptor keyway. The tube easily locks in place by means of a plastic locking nut which threadedly engages the adaptor. The tube extends to within $\frac{1}{4}$ inch of the bottom of the hopper.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of a crop spraying aircraft depicting the positioning of the spraying apparatus including the hopper.

FIG. 2 is a front elevational view of the hopper cleaner attachment.

FIG. 3 is an elevational sectional view taken substantially along a plane passing through section line 3—3 of FIG. 2.

FIG. 4 is an exploded part sectional view of the hopper cleaner attachment.

DESCRIPTION OF THE PREFERRED EMBODIMENT

Now with reference to the drawings, a hopper cleaner attachment incorporating the principles and concepts of the present invention and generally referred to by the reference numeral 10 will be described in detail.

With particular reference to FIG. 1, it will be seen that an aircraft 12 is equipped with a storage hopper 13 which is of conventional design having a substantially rectangular upper portion and a lower portion having hinged doors 14 and 16. Doors 14 and 16 are operated by conventional means which, for clarity, have not been depicted. A pump 18 is connected between outlet tube 20 from the hopper and the supply line to the spray nozzles (not shown).

With reference to FIGS. 2-4, it can be seen that the bottom of hopper 13 is formed by the meeting of doors 14 and 16 and is spaced substantially below the attachment of outlet tube 20 to the hopper side wall. During conventional operation, the chemical fertilizer shown at 22 stored in hopper 13 below the level of outlet tube 20 could only be removed by opening doors 14 and 16. In order to overcome this deficiency, the hopper cleaner attachment 10 is attached to the side wall of hopper 13 to allow access to the bottom of the hopper. The attachment 10 includes an adaptor 24 which is fixed to the hopper by use of bolts 26 and nuts 28. Adaptor 24 removably mounts the suction tube 30 which extends down to within ¼ inch of the bottom of the hopper in order to communicate that portion of the hopper with outlet tube 20.

Adaptor 24 comprises a mounting flange 32 containing holes 34 through which bolts 26 pass. Attached integrally to the mounting flange 24 is connector 36. Connector 36 has external threads 38 about its outer periphery and includes an inwardly bevelled free edge 40 which cooperates with outwardly bevelled edge 42 of the suction pipe 30. A pair of radially inward extending projections 44 and 46 are attached to the inner surface of connector 36 and are spaced circumferentially to form a slot 48 therebetween.

The suction tube 30 has an open bevelled end 50 which is disposed adjacent the bottom of the hopper. The end 50 is long and narrow to fit within the confines of the bottom. The cross section of suction tube 30 becomes more symmetrical as the tube rises upward to bend 52. The suction tube makes a 90° turn at bend 52 after which it has a symmetrical circular cross section to mate with the connector 36. Throughout the entire extent of the suction tube, the cross-sectional area remains constant at about 3.14 sq. inches in order that a smooth, consistent liquid flow can be maintained through the tube. Accordingly, even though the tube 30 flares outwardly toward the open end 50, the cross-sectional area in the flared portion is exactly the same as that of the end mating with connector 36. Attached within the suction tube 30 and extending beyond outwardly bevelled edge 42 is a key 54 which is received in slot 48 in order to insure proper orientation of the suction tube when it is connected to adaptor 24. Key 54 slides easily into slot 48 and outwardly bevelled edge 42 meets with inwardly bevelled edge 40 and provides a seal between the suction tube 30 and adaptor 24. A nut 56 includes threads 58 which cooperate with threads 38 of the connector 36. Nut 56 includes an internal circumferential groove 60 which rides on external flange 62 of the suction pipe 30. Accordingly, when the nut 56 is tightened down on connector 36, the upper surface of groove 60 presses against flange 62 thus causing a tight communication between bevelled edges 40 and 42.

The entire attachment 10 can be made from polypropylene or any other suitable chemical resistant material, and the attachment can easily be retrofitted to existing hoppers. The attachment provides an easy way of insuring that virtually all chemicals stored in the hopper will be dispensed, if desired. Also, suction tube 30 can easily be removed from adaptor 24 in the event that the user wishes to dispense dry fertilizer in a conventional manner by opening doors 14 and 16. The suction pipe 30 can be stored in a convenient location with nut 56 attached thereto by means of groove 60 and flange 62. Accordingly, it is simple to reattach the suction pipe to adaptor 24 when desired.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An aircraft crop spraying apparatus comprising a hopper having a bottom, an outlet opening formed in said hopper, an outlet tube connected to said outlet opening, said outlet opening being spaced above the bottom of said hopper, an adaptor fixedly mounted to said hopper over said outlet opening; a suction tube removably attached to said adaptor, said suction tube extending from said adaptor to a position adjacent to but slightly spaced from the bottom of said hopper, said adaptor including a connector having external threads formed thereon and further including a nut having internal threads, said nut being engaged with said suction tube for removably mounting said suction tube to said adaptor, one of said connector and suction tube having an inwardly bevelled free edge and the other of said connector and said suction tube having an outwardly bevelled free edge for cooperation with said inwardly bevelled free edge when said suction tube is mounted to said adaptor, said suction tube further including an external annular flange, said nut including an internal groove surrounding said flange for causing communication between said nut and said suction tube, said connector including an axially extending groove means, said suction tube including an axially extending key means fixed to such suction tube for insertion in said groove means to retain an inlet on the suction tube adjacent the bottom of the hopper to enable removal of material from that portion of the hopper below the outlet.

2. The invention as defined in claim 1 wherein said suction tube includes first and second portions, said first and second portions being angularly oriented with respect to each other.

3. The invention as defined in claim 1 wherein said suction tube has a constant cross-sectional area throughout its length.

4. An attachment for connection to a hopper of a crop spraying apparatus, comprising an adaptor having a mounting flange and an externally threaded connector integrally connected to said mounting flange, said connector having a free end; a suction tube having a free end engageable with said free end of said connector, a flange formed about the exterior of said suction tube; a nut operatively engaging said flange on said suction tube, said nut having internal threads for connection with said external threads of said connector, said connector being circular in cross section, said free end of said suction tube being circular in cross section, and said flange on the suction tube being annular in configuration, said free end of said connector being bevelled and said free end of said suction tube being bevelled oppositely from said free end of said connector, and a key means fixedly mounted to one of said connectors and said suction tube and a groove means for receiving said key means formed in the other of said connector and said suction tube.

5. The invention as defined in claim 4 wherein said suction tube is formed with a constant cross-sectional area throughout its length.

6. The invention as defined in claims 1 or 4 wherein said hopper has a rectangular upper portion and a lower portion having hinged doors to open and close responsive to control means and the adaptor being removable in the event that dry chemical fertilizer is placed in the hopper for distribution so the adaptor will not interfere with the free flow of the dry fertilizer.

7. The invention as defined in claims 1 or 4 wherein said hopper is for being filled with liquid chemical spray material and which can be dumped through hinged doors of said hopper.

8. The invention as defined in claims 1 or 4 wherein said hopper is constructed of chemical resistant material such as polypropylene.

9. An attachment for connection to a hopper of a crop spraying apparatus, comprising an adaptor having a mounting flange and a connector integrally connected to said mounting flange, said connector having a free end; a suction tube having a free end engageable with said free end of said connector, coupling means operatively engaging said adaptor and said suction tube, said coupling means having sealing means between said free end of said suction tube and the free end of the connector, said sealing means including the free end of said connector being bevelled and said free end of said suction tube being bevelled oppositely from said free end of said connector, and a key means fixedly mounted to one of said connectors and said suction tube and a groove means for receiving said key means formed in the other of said connector and said suction tube whereby actuation of the coupling means urges the bevelled surfaces together.

* * * * *